A. JOHNSTON, DEC'D.
L. A. JOHNSTON, EXECUTRIX.
TRANSMISSION GEAR.
APPLICATION FILED DEC. 11, 1913.
1,136,342.
Patented Apr. 20, 1915.
2 SHEETS—SHEET 1.
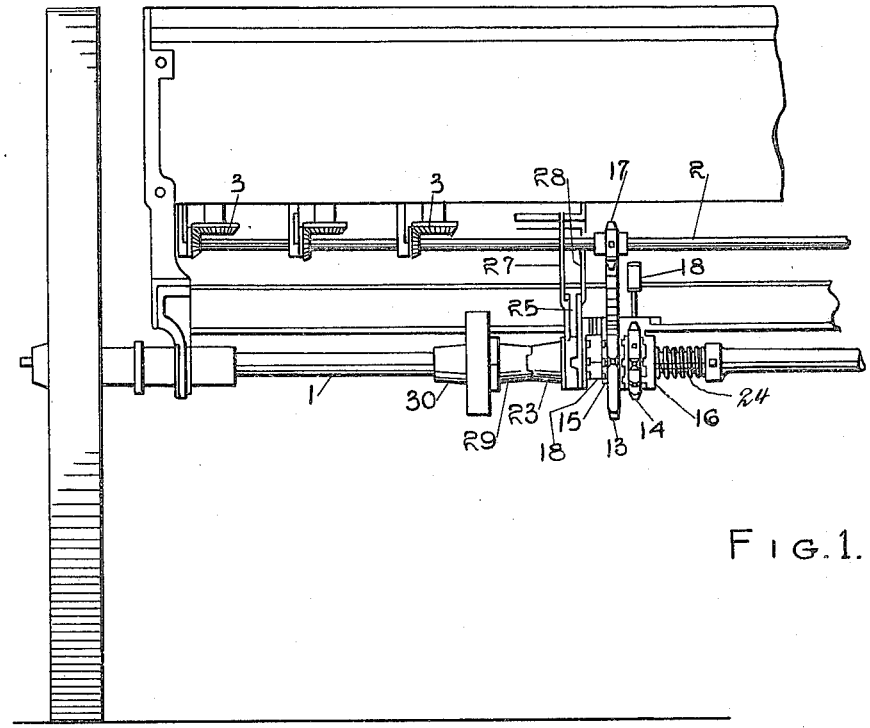
FIG. 1.
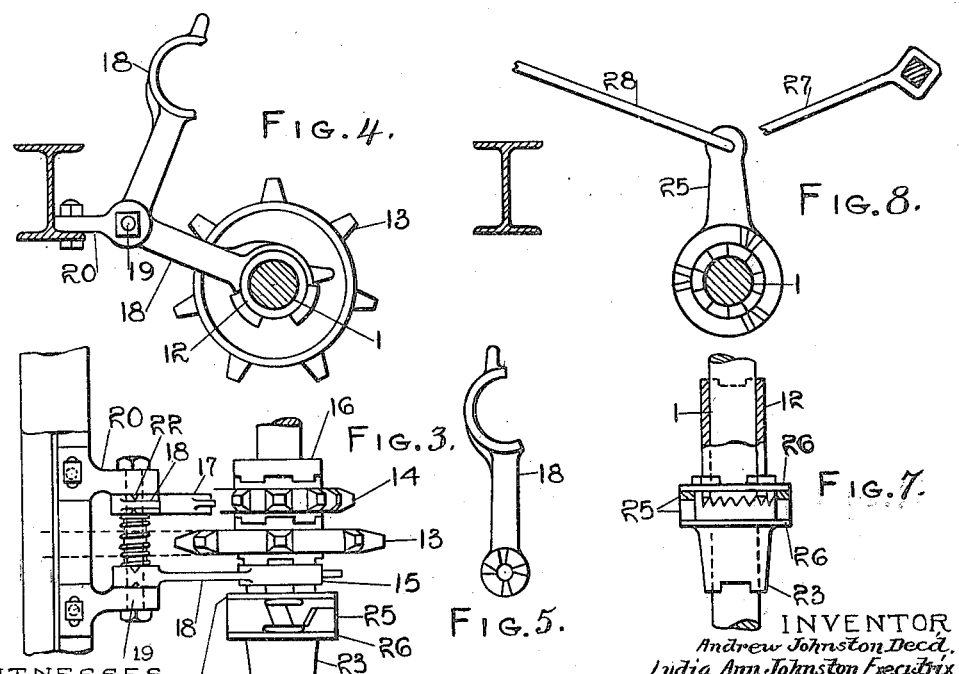
WITNESSES
N. R. Tyndall
E. P. Hall
INVENTOR
Andrew Johnston Dec'd.
Lydia Ann Johnston Executrix
By J. Edward Maybee
ATTORNEY

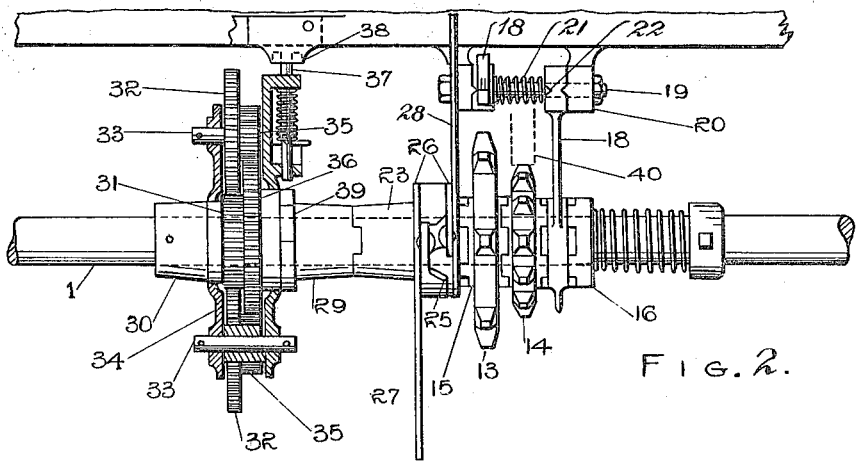
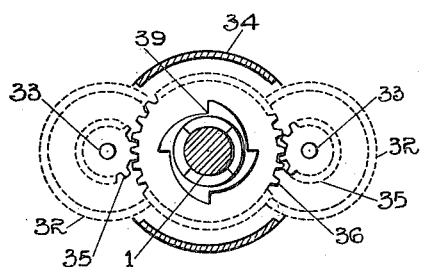
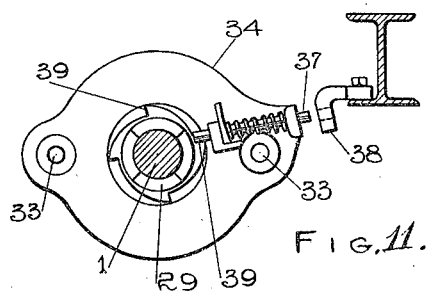
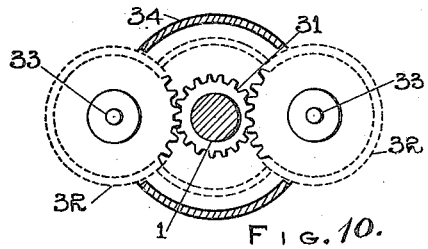
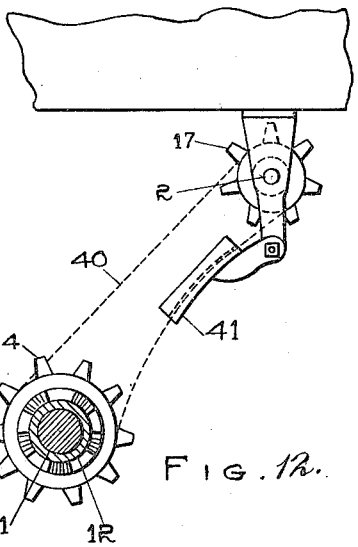

UNITED STATES PATENT OFFICE.

ANDREW JOHNSTON, DECEASED, LATE OF TORONTO, ONTARIO, CANADA, BY LYDIA ANN JOHNSTON, EXECUTRIX, OF TORONTO, ONTARIO, CANADA, ASSIGNOR TO MASSEY-HARRIS COMPANY, LIMITED, OF TORONTO, CANADA.

TRANSMISSION-GEAR.

1,136,342.  Specification of Letters Patent.  Patented Apr. 20, 1915.

Application filed December 11, 1913. Serial No. 806,033.

*To all whom it may concern:*

Be it known that I, LYDIA ANN JOHNSTON, am the executrix of the estate of ANDREW JOHNSTON, late of the city of Toronto, Province of Ontario, Canada, and that the said ANDREW JOHNSTON did invent new and useful Improvements in Transmission-Gear, of which the following is a specification.

In seeders and fertilizers the necessity exists for feeding the fertilizer at different rates of speed.

The one object of the present invention is to devise a simple and effective form of change-speed gear.

A simple and convenient means must also be provided within the fertilizer box for controlling the flow of the fertilizer to the discharge spouts, and the second part of the invention relates to specific construction of such means.

The invention is illustrated in the accompanying drawings in which—

Figure 1 is a rear view of part of a seeder and fertilizer constructed in accordance with the invention. Fig. 2 is a plan view of the change-speed gear. Fig. 3 is a similar view of part of the same in a different position. Fig. 4 is a vertical section illustrating the means for holding the clutch members of the gear as shifted. Fig. 5 is a side elevation of one of the clutch retaining arms. Fig. 6 is a longitudinal section of part of the change speed gear, illustrating particularly the clutch mechanism for throwing the same out of gear. Fig. 7 is a similar view of the clutch shown in Fig. 8 with the clutch in gear. Fig. 8 is a vertical sectional end view illustrating the arrangement of the clutch shifting members shown in Figs. 8 and 9. Figs. 9 and 10 are section of the planetary change-speed gear. Fig. 11 is a sectional elevation as showing means for holding the casing of the planetary gear stationary for permitting it to rotate with the driven sleeve. Fig. 12 is a sectional view illustrating particularly the tightener for the chain conveying movement to the fertilizer distributer shaft.

In the drawings like numerals of reference indicate corresponding parts in the different figures.

1 is the axle from which power is taken to actuate the fertilizer distributers. From the axle by means hereinafter described the fertilizer distributer shaft 2 is driven. This by means of the bevel gearing 3 actuates the distributers which are of ordinary construction.

The change speed gear for driving the fertilizer distributer shaft 2 is arranged as follows: A sleeve 12 is driven as hereinafter described. On this sleeve are supported two sprockets 13 and 14 of different diameters, the hubs of which engage one another with a positive clutch, as shown, so that they will revolve together. The outer ends of the hub of each sprocket wheel are also formed as half clutches so that they may be engaged with the similarly engaged clutch members 15 and 16 connected with the ends of the sleeve 12.

By shifting the sprocket wheels on the sleeve 12 either one of them may be brought into line with the sprocket wheel 17 on the fertilizer distributer shaft 2. To hold the sprocket wheels as moved are provided the hinged retainers 18 which are adapted to be swung down, as shown in Figs. 2 and 3, to fit between the hubs of the sprocket wheels and the clutch members to hold the sprocket wheels in either of the positions shown, and in either position the sprocket wheels are driven from the sleeve 12. These retainers 18 are pivoted on the spindle 19 carried by the brackets 20 on the fertilizer box. Between their hubs is located a coil spring 21 tending to press them against the brackets. V-shaped projections 22 on the brackets engage similar depressions in the hubs of the retainers, so that the latter tend to stay either up or down as moved (see Figs. 2, 4 and 5).

The sleeve 12 has a clutch connection with the sleeve 23. The adjacent ends of the sleeves 12 and 23 are formed with ratchet clutch members, as shown, and the sleeve 12 is slidable on the axle against the tension of the spring 24 which tends to put the clutch in gear. The sleeve 12 is moved endwise to throw the clutch out of gear by means of the two arms 25 which bear against the collars 26 on the two sleeves and have inclined projections formed on their hubs which tend to spread the arms when the latter are moved relative to one another, as shown more particularly in Figs. 2, 6, 7 and 8. One arm is held stationary by means of a rod 27 led to a suitable stationary part while the other arm is provided with a rod 28 by means of which it may be shifted by the operator. The sleeve 23 has a driving connection with a sleeve 29 which is the driven sleeve of the planetary gear.

30 is a sleeve fixed to the axle forming the driving sleeve of the planetary gear. The driving sleeve has the gear pinion 31 secured thereto. This meshes with one or more gear wheels 32, each of which is fast on a spindle 33 journaled in the casing 34 journaled on the sleeves 29 and 30. Each spindle 33 carries also a pinion 35 meshing with the gear wheel 36 fast on the sleeve 29.

If the casing 34 be held stationary it is evident that the driven sleeve 29 will be driven at a given speed while if the casing be allowed to revolve with the sleeve 29 that the latter will have a different speed. The casing is therefore provided with a spring actuated bolt 37. When this bolt is slid into engagement with the keeper 38 carried by the fertilizer box (see Fig. 2) the casing will be held stationary. If the bolt is allowed to spring into engagement with the clutch 29 on the sleeve 29 the casing will revolve with the latter and so the differentiated speeds may be obtained as desired. This specific construction of this planetary gear forms an important part of my present invention.

By means of this device four speeds of drive of the fertilizer distributer shaft 2 may be obtained. By means of the planetary gear the sprockets 13 and 14 may be driven at either of two speeds, and by shifting these latter and shifting the chain 40 from one sprocket wheel to the other, as indicated in Figs. 2 and 3 the speed changes possible are reduced to four in number.

To take up any slack in the chain 40 when it is on the smaller sprocket wheel the hinged tightener 41 of ordinary construction is provided.

What is claimed as the invention is:

1. In transmission gearing, the combination of a drive-shaft including a transmission sleeve having an inwardly facing clutch member at either end; two connected loose sprocket wheels of different size movable lengthwise of said sleeve and provided with clutch members engageable with the clutch members of the sleeve; two retainers hinged on a stationary part and adapted to be swung down to fit between adjacent clutch members of the sleeve and sprockets; a shaft and a sprocket wheel on said shaft into alinement with which either of the aforesaid sprocket wheels may be brought by shifting them as aforesaid.

2. In transmission gearing, the combination of a drive-shaft including a transmission sleeve having an inwardly facing clutch member at either end; two connected loose sprocket wheels of different size movable lengthwise of said sleeve and provided with clutch members engageable with the clutch members of the sleeve; a spindle carried by a stationary part; two retainers provided with hubs journaled on said spindle and adapted to be swung down to fit between adjacent clutch members of the sleeve and sprockets; a stationary part at each end of the spindle adjacent said hubs; a coil spring between the hubs, said hubs and stationary parts having complementary projections and depressions whereby the retainers may be yieldingly held up or down; a shaft and a sprocket wheel on said shaft into alinement with which either of the aforesaid sprocket wheels may be brought by shifting them as aforesaid.

Toronto, Ont. this fourth day of Dec. 1913.

LYDIA ANN JOHNSTON,
*Executrix of the estate of Andrew Johnston, deceased.*

Signed in the presence of—
  Mrs. Louis E. Way,
  Charles Wm. Leod.

Copies of this patent may be obtained for five cents each, by addressing the "Commissioner of Patents, Washington, D. C."